US009562602B2

(12) United States Patent
Sieveking et al.

(10) Patent No.: US 9,562,602 B2
(45) Date of Patent: Feb. 7, 2017

(54) TRI-LOBE BEARING FOR A GEARBOX

(71) Applicant: Solar Turbines Incorporated, San Diego, CA (US)

(72) Inventors: Edward William Sieveking, San Diego, CA (US); Yuanhong Guan, Peoria, IL (US)

(73) Assignee: Solar Turbines Incorporated, San Diego, CA (US)

( * ) Notice: Subject to any disclaimer, the term of this patent is extended or adjusted under 35 U.S.C. 154(b) by 219 days.

(21) Appl. No.: 14/325,179

(22) Filed: Jul. 7, 2014

(65) Prior Publication Data

US 2016/0003341 A1    Jan. 7, 2016

(51) Int. Cl.

| F16H 1/34 | (2006.01) |
|---|---|
| F16H 57/00 | (2012.01) |
| F16C 17/02 | (2006.01) |
| F16H 57/08 | (2006.01) |
| F16C 33/10 | (2006.01) |
| F16C 3/02 | (2006.01) |
| F16H 1/28 | (2006.01) |

(52) U.S. Cl.
CPC ......... *F16H 57/0006* (2013.01); *F16C 17/028* (2013.01); *F16C 33/1055* (2013.01); *F16C 33/1075* (2013.01); *F16H 57/08* (2013.01); *F16H 1/28* (2013.01); *F16C 3/02* (2013.01); *F16H 2057/085* (2013.01)

(58) Field of Classification Search
CPC ....... F16H 7/0006; F16H 57/08; F16H 17/028
See application file for complete search history.

(56) References Cited

U.S. PATENT DOCUMENTS

| 5,909,966 A | 6/1999 | Suzuki et al. |
| 5,944,427 A | 8/1999 | Murabe et al. |
| 5,997,180 A | 12/1999 | Ishizuka et al. |
| 6,056,509 A * | 5/2000 | Nakayama ............... B63H 5/10 384/100 |
| 6,123,460 A | 9/2000 | Takeuchi et al. |
| 7,703,432 B2 | 4/2010 | Shaffer |
| 8,317,400 B2 | 11/2012 | Petitjean et al. |
| 2007/0084187 A1 | 4/2007 | Moniz et al. |

(Continued)

FOREIGN PATENT DOCUMENTS

| FR | 2616861 | 12/1988 |
| KR | 2013106952 | 10/2013 |

*Primary Examiner* — Derek D Knight
(74) *Attorney, Agent, or Firm* — Procopio, Cory, Hargreaves & Savitch LLP (57) ABSTRACT

A bearing for a gearbox, the bearing having a cylindrical body. The cylindrical body defines a hollow interior chamber. The cylindrical body has a gear supporting section. The gear supporting section has a cross-section formed by three lobes equally distributed around a circumference of the cylindrical body. Each of the lobes has a land portion having a first radius over at least 20% of the lobe. Each lobe also has a tapered portion that gradually slopes from the first radius of the land portion to a reduced radius region that is smaller than the first radius. The tapered portion is formed over less than 80% of each lobe. Each lobe also has an opening formed in the reduced radius region and a flow passage fluidly connecting the hollow interior of the cylindrical body with the opening formed in the reduced radius region.

16 Claims, 6 Drawing Sheets

(56) References Cited

U.S. PATENT DOCUMENTS

| 2009/0148084 | A1* | 6/2009 | Komori ............... F16C 3/02 |
| | | | 384/107 |
| 2010/0092115 | A1 | 4/2010 | Wendling |
| 2011/0200422 | A1 | 8/2011 | Gutknecht |
| 2013/0053202 | A1 | 2/2013 | Ghanime et al. |
| 2013/0192264 | A1 | 8/2013 | McCune et al. |

* cited by examiner

TRI-LOBE BEARING FOR A GEARBOX

TECHNICAL FIELD

The present disclosure generally pertains to engines, and is more particularly direct to a gearbox for transmitting the rotation of the engine to drive rotating equipment such as generators, pumps, and heat exchangers.

BACKGROUND

Gas turbine systems include a rotor unit mounted to rotate inside a stationary external housing and generally have a gearbox that is mounted at one end of the gas turbine engine. The gearbox is generally positioned adjacent the turbine engine and coupled in a manner to use power from the gas turbine engine to drive the gas turbine engine's accessories such as electrical generators, fluid pumps, and heat exchangers for cooling oil or heating fuel. The gearbox includes a several interlocking gears rotating on oil bearings. During operation of the gas turbine engine and the gas turbine engine's accessories, sub-synchronized vibrations can develop due to fluid-structure coupling between torsional and linear vibrations inside the rotating components of the gas turbine engine and gas turbine engine's accessories.

U.S. Patent App. Pre-Grant Publication No. 2009/0148084 to I. Komori et al. discloses a fluid dynamic bearing device equipped with a shaft member of high strength. The bearing device is disclosed as being capable of maintaining high bearing performance at low cost. The bearing device has a shaft member equipped with a shaft blank and a resin portion. The shaft blank has, as an integrated unit, a shaft part formed of a material of a higher strength than resin, and a protruding part protruding radially outwards from the shaft part. The resin portion covers at least one end surface of the protruding part of the shaft blank and faces a thrust bearing gap.

The present disclosure is directed toward overcoming one or more of the problems discovered by the inventors or that is known in the art.

SUMMARY OF THE DISCLOSURE

In one embodiment, a bearing for a gearbox is described. The bearing has a cylindrical body. The cylindrical body defines a hollow interior chamber. The cylindrical body has a gear supporting section. The gear supporting section has a cross-section formed by three lobes equally distributed around a circumference of the cylindrical body. Each of the lobes has a land portion, a tapered portion, an opening, and a flow passage. The land portion has a first radius over at least 20% of the lobe. The tapered portion gradually slopes from the first radius of the land portion to a reduced radius region that is smaller than the first radius. The tapered portion is formed over less than 80% of each lobe. The opening is formed in the reduced radius region of the lobe. The flow passage fluidly connects the hollow interior of the cylindrical body with the opening formed in the reduced radius region.

In another embodiment, another bearing for a gearbox is described. The bearing has a substantially cylindrical body defining a hollow interior chamber. The cylindrical body has a first gear supporting section and a second gear supporting section. The first gear supporting section has a cross-section formed by three lobes equally distributed around a circumference of the cylindrical body. Each lobe of first gear supporting section has a land portion, a tapered portion, an opening, and a flow passage. The land portion of each lobe of the first gear supporting section is formed with a first radius over at least 20% of the lobe of the first gear supporting section. The tapered portion gradually slopes from the first radius of the land portion to a reduced radius region that is smaller than the first radius. The tapered portion is formed over less than 80% of each lobe of the first gear supporting section. The opening is formed in the reduced radius region of each lobe of the first gear supporting section. The flow passage fluidly connects the hollow interior of the cylindrical body with each of openings of the three lobes of the first gear supporting section. The second gear supporting section has a cross-section formed by three lobes equally distributed around a circumference of the cylindrical body. Each lobe of second gear supporting section has a land portion, a tapered portion, an opening, and a flow passage. The land portion is formed with a first radius over at least 20% of each lobe of the second gear supporting section. The tapered portion gradually slopes from the first radius of the land portion to a reduced radius region that is smaller than the first radius. The tapered portion is formed over less than 80% of each lobe of the second gear supporting section. The opening is formed in the reduced radius region of each lobe of the second gear supporting section. The flow passage fluidly connects the hollow interior of the cylindrical body with each of openings formed in the reduced radius regions of the lobes of the second gear supporting section. Further, the flow passage of one of the lobes of the second gear supporting section is angularly positioned an angle between 15° and 35° above horizontal.

In another embodiment, a gearbox is described. The gearbox includes an input shaft, an input planetary gear, an output planetary gear, a ring gear, an output shaft, and a bearing. The input planetary gear engages, and is radially offset from, the input shaft. The input planetary gear defines a first central bore. The output planetary gear defines a second central bore aligned with the first central bore. The output planetary gear is rotationally coupled to the input planetary gear. The ring gear is coupled to the output planetary gear. The output shaft is coupled to the ring gear. The bearing is inserted into the first central bore of the input planetary gear and the second central bore of the output planetary gear. The bearing has a substantially cylindrical body defining a hollow interior chamber. The cylindrical body has an output planetary gear supporting section and an input planetary gear supporting section. The output planetary gear supporting section supports the output planetary gear and the input planetary gear supporting section supports the input planetary gear. The output planetary gear supporting section has a cross-section formed by three lobes equally distributed around a circumference of the cylindrical body. Each lobe of the output planetary gear supporting portion has a land portion, a tapered portion, an opening, and a flow passage. The land portion forms a first output clearance between a first radius of the cylindrical body and an inner radius of the second central bore over at least 20% of each lobe of the output planetary gear supporting section. The tapered portion gradually slopes from the first output clearance of the first radius of the land portion to a second output clearance that is greater than the first output clearance, between a reduced radius region of the cylindrical body and the inner radius of the second central bore. The tapered portion is formed over less than 80% of each lobe of the output planetary gear supporting section. The opening is formed in the reduced radius region of each lobe of the output planetary gear supporting section. The flow passage fluidly connects the hollow interior of the cylindrical body with the opening formed in the reduced radius region of each of the lobes of the output planetary gear supporting section. The flow passage of one of the lobes of the output planetary gear supporting section being angularly positioned an angle between 30° and 50° below horizontal. The input planetary gear supporting section has a cross-section formed by three lobes equally distributed around a circumference of the cylindrical body. Each lobe of input planetary gear supporting portion has a land portion, a tapered portion, an opening, and a flow passage. The land portion forms a first input clearance between the first radius of the cylindrical body and an inner radius of the first central bore over at least 20% of each lobe of the input planetary gear supporting section. The tapered portion gradually slops from the first input clearance of the first radius of the land portion to a second input clearance, which is greater than the first input clearance, between the reduced radius region of the cylindrical body and the inner radius of the first central bore. The tapered portion is formed over less than 80% of each lobe of the input planetary gear supporting section. The opening is formed in the reduced radius region of each lobe. The flow passage fluidly connects the hollow interior of the cylindrical body with each of openings formed in the reduced radius regions of each of the lobes of the input planetary gear supporting section.

DETAILED DESCRIPTION

The system is disclosed herein include a gearbox for a gas turbine engine including a bearing having at least one gear supporting section. In embodiments, each gear supporting section is formed by three lobes equally spaced around the circumference of the bearing. Each lobe includes a land portion having a first radius and a tapered portion sloping towards a reduced radius region having a radius less than the first radius. Each lobe also includes an oil supply opening fluidly communicating with an oil supply passageway formed within the bearing.

Figure 1:
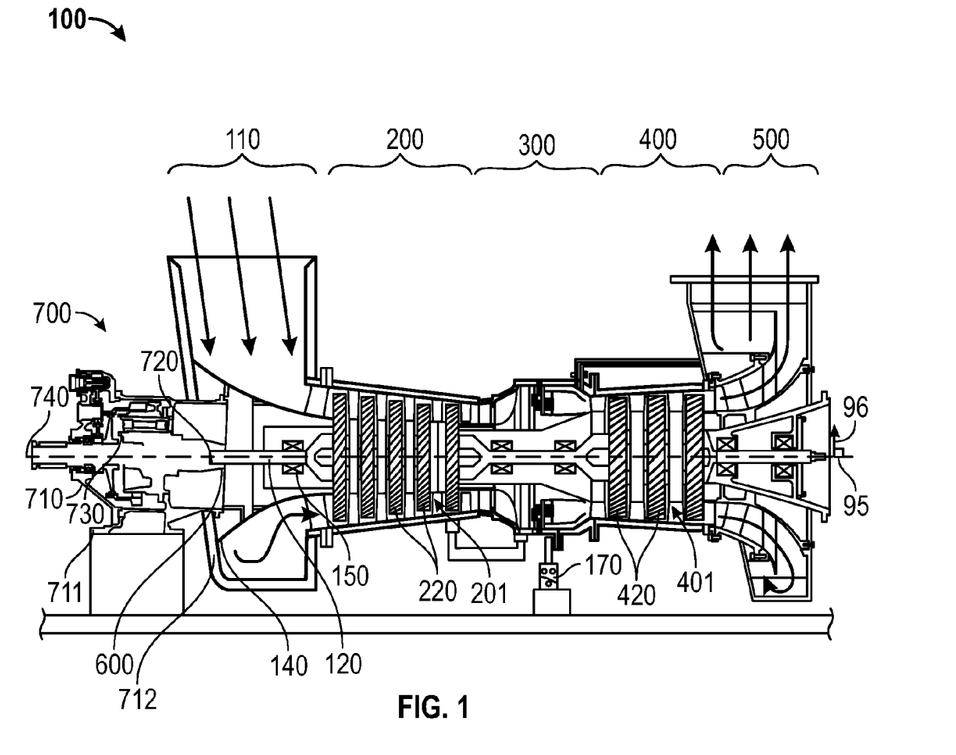
FIG. 1 is a schematic illustration of an exemplary gas turbine engine.

FIG. 1 is a schematic illustration of an exemplary gas turbine engine and a gearbox. Some of the surfaces have been left out or exaggerated (here and in other figures) for clarity and ease of explanation. Also, the exaggerated alignment lines have been included to illustrate the alignment of the gas turbine engine.

The present disclosure may use the gas turbine engine 100 for orientation purposes. In particular, the disclosure may reference a center axis 95 of rotation of the gas turbine engine 100, which may be generally defined by the longitudinal axis of its shaft 120. Thus, all references to radial, axial, and circumferential directions and measures refer to the center axis 95, unless specified otherwise, and terms such as "inner" and "outer" generally indicate a lesser or greater radial distance from the center axis 95, wherein a radial 96 may be in any direction perpendicular and radiating outward from center axis 95.

Generally, the gas turbine engine 100 includes an inlet 110, a shaft 120 (supported by bearings 150), a compressor 200, a combustor 300, a turbine 400, an exhaust 500, and a power output coupling 600. One or more sections may be coupled together at their housings via flanges. In addition, flanges may be provided for lifting and/or supporting one or more sections of the gas turbine engine 100. The gas turbine engine 100 also includes an alignment mount 170 supporting the gas turbine engine.

The compressor 200 may include one or more rotating compressor rotor assemblies 220 populated with compressor blades, making up a compressor rotor 201. The turbine 400 includes one or more rotating turbine rotor assemblies 420 populated with turbine blades, making up a turbine rotor 401. The compressor rotor 201 and the turbine rotor 401 may rotate about the center axis 95.

The gas turbine engine 100 may be coupled to a gearbox 700. The gearbox 700 includes a power input coupling 720, drive gear system 730, and a gearbox power output 740. The gearbox 700 also includes a gearbox housing 710 having a gearbox base mount 711 and a gas turbine engine interface 712. The power input coupling 720 includes any convenient coupling mechanism (e.g., spline-to-receiver, flange-to-flange, etc.) and couples to the power output coupling 600 of the gas turbine engine 100. The drive gear system 730 (discussed in greater detail below with respect FIGS. 2-4) includes an arrangement of gears, and is generally configured to transmit power from the gas turbine engine 100 to the gearbox power output 740 at the desired torque and speed. The gearbox power output 740 can be used to drive one or more accessories (not shown), such as, for example, generators for electricity, pumps for circulating fluids, heat exchangers for cooling oil or heating fuel, any other accessories or combinations thereof known in the art. The gearbox housing 710 encloses the drive gear system 730. The gearbox base mount 711 attaches to any structural ground, base, or support structure, supporting the gearbox 700. The gas turbine engine interface 712 may include any convenient form or structure configured to couple with the gas turbine engine 100. For example, the gearbox housing 710 may be mounted to a bearing housing 140 via the gas turbine engine interface 712 and support a first end of the gas turbine engine 100 via the bearing housing 140.

Figure 2:
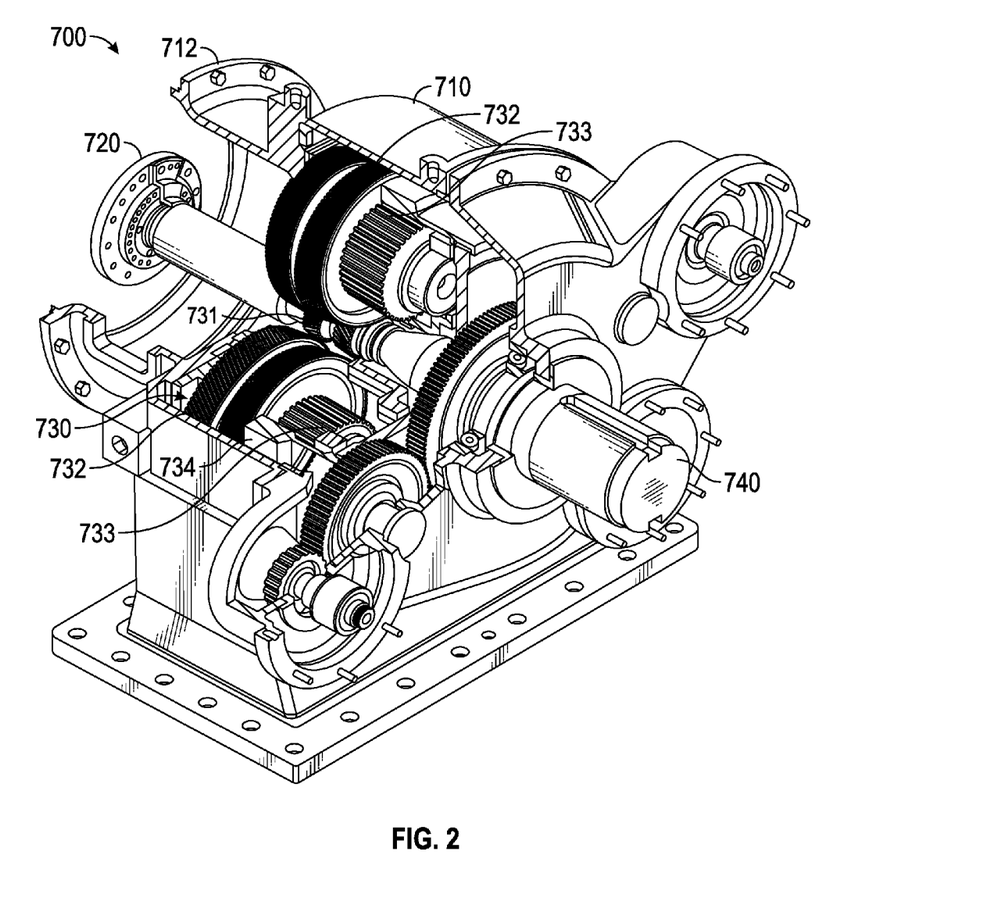
FIG. 2 is a perspective view of the gearbox of FIG. 1 with a partial cut-away of the gearbox housing.

FIG. 2 is a perspective view of the gearbox 700 of FIG. 1 with a partial cut-away of the gearbox housing 710 to illustrate the interior of the gearbox 700. The drive gear system 730 includes several gears 731, 732, 733, 734 transmitting power from the power input coupling 720 to the gearbox power output 740. As illustrated, the power output coupling 600 of the gas turbine engine 100 is coupled to the power input coupling 720 of the gearbox 700. The power input coupling 720 of the gearbox 700 is also coupled to a first gear 731 of the drive. gear system 730. The first gear 731 of the drive gear system 730 engages at least one second gear 732, which is radially adjacent to the first gear 731. The second gear 732 is coupled to a third gear 733 which is linearly adjacent to the second year 732. The third gear 733 engages a fourth gear 734 which is radially adjacent to the third gear 733 and coupled to the gearbox power output 740.

Figure 3:
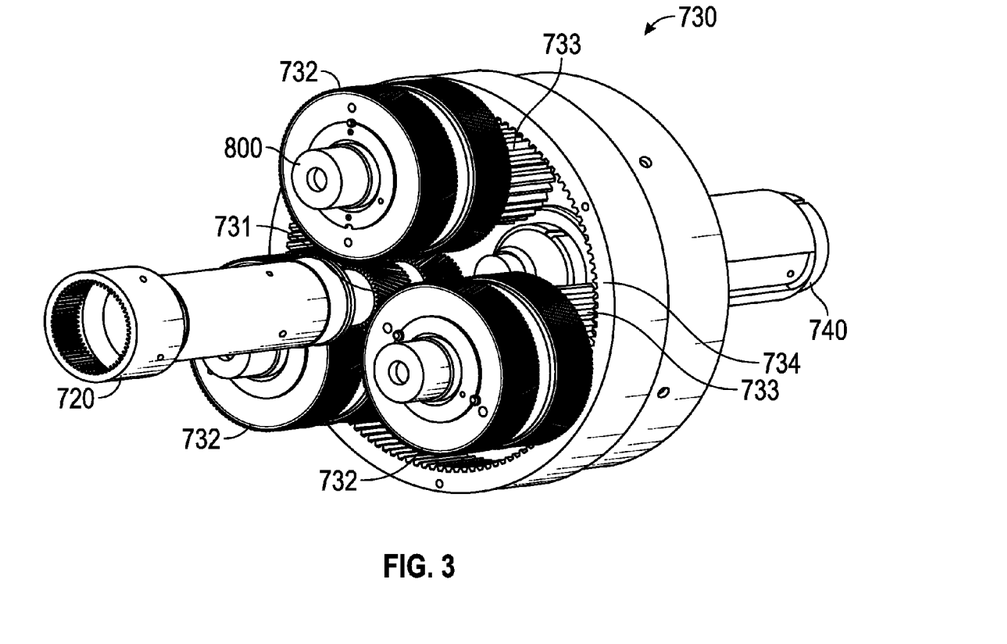
FIG. 3 is a perspective view of the drive gear system of the gearbox of FIG. 1.

FIG. 3 is a perspective view of the drive gear system 730 of the gearbox of FIG. 1. In the embodiment of FIG. 3, the drive gear system 730 is an epicyclical drive gear system (also known as a planetary gear train). However, other embodiments of the drive gear system 730 may have other configurations as may be apparent to a person of ordinary skill in the art.

As illustrated in FIG. 3, the power input coupling 720 is rotationally coupled to, and linearly offset from, the first gear 731 such that the power input coupling 720 in the first gear 731 rotate about a common axis. In the epicyclical drive system of the present embodiment, the first gear 731 is a sun gear 731 because the other gears (732, 733, 734) are radially spaced around the first gear 731 during operation of the drive gear system 730.

In FIG. 3, three second gears 732 are provided equally spaced around the circumference of the sun gear 731. In the epicyclical drive system of the present embodiment, each of the second gears 732 is one of a pair of coupled planetary gears and thus is considered an input planetary gear 732 because it is the planetary gear closer to the input side of the gearbox 700. FIG. 3 also illustrates three third gears 733 each linearly aligned with one of the input planetary gears 732. Each of these three third gears 733 is the second of each pair of coupled planetary gears and is considered an output planetary gear 733 because it is the planetary gear closer to the output side of the gearbox 700. Each pair of coupled planetary gears (i.e. input planetary gear 732/output planetary gear 733) is mounted on a rotational bearing 800, which is radially offset from the center of rotation of the sun gear 731.

Each of the three output side planetary gears 733 engages and is radially surrounded by the forth gear 734. In the epicyclical drive system of the present embodiment, the fourth gear 734 is considered an annular or ring gear 734. The ring gear 734 is coupled to the power output coupling 740 of the gearbox 700.

As should be apparent to a person of ordinary skill in the art, embodiments of the present application are not limited to this described Epicyclical drive system configuration and alternate configurations may be used.

Figure 4:
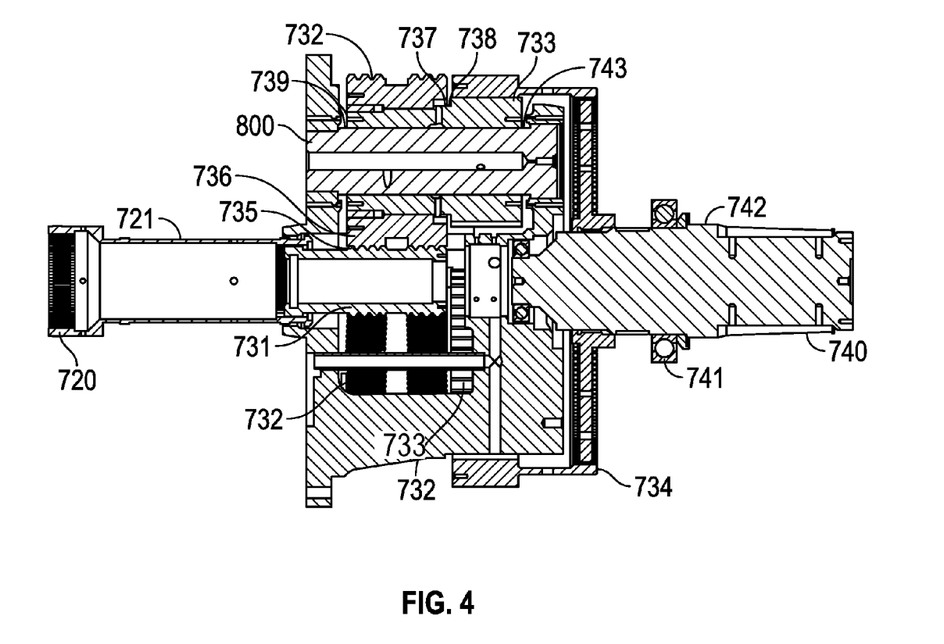
FIG. 4 is a cross-sectional view of the drive gear system of the gearbox of FIG. 1.

FIG. 4 is a cross-sectional view of the drive gear system 730 of the gearbox 700 of FIG. 1. As illustrated, the power input coupling 720 is coupled to the sun gear 731 by an input shaft 721. In this embodiment, the input shaft 721 is attached to the power input coupling 720 and the sun gear 731. The mechanism of attachment between the input shaft 721 and the power input coupling 720 and/or the sun gear 731 is not particularly limited.

The sun gear 731 includes a series of teeth 735 that engage a series of teeth 736 formed on each of the input planetary gears 732. Each input planetary gear 732 has a recess 737 which receives a protrusion 738 formed on one the output planetary gear 733, forming a friction or press fitting coupling the input planetary gear 732 to the output planetary gear 733. The input planetary gears are surrounded and engaged by the ring gear 734. The ring gear 734 is coupled to the gearbox power output 740 by a shaft 742 supported by a gearbox power output support bearing 741.

Each of the input planetary gears 732 has a central bore 739 formed through its center. Additionally, each of the output planetary gears 733 has a central bore 743 for through its center. The central bore 739 of an input planetary gear 732 is aligned with the central bore 743 of an output planetary gear 733 and a support bearing 800 is inserted through the central bores 739, 743. A small clearance may be formed between the support bearing 800 and the central bores 739, 743. As discussed below with respect to FIGS. 5-9, the bearing 800 has a tri-lobe design such that the outer diameter 810 varies along portions of the circumference of the bearing 800 and the clearance between the support bearing 800 and the central bores 739, 743 may also vary. For example, the maximum clearance may vary between $^{13}/_{1000}$ and $^{18}/_{1000}$ of an inch (between 0.33 mm and 0.46 mm). Further, the minimum clearance may vary between $^{6}/_{1000}$ and $^{10}/_{1000}$ of an inch (between 0.15 mm and 0.25 mm). In other embodiments, the maximum clearance may vary in the range between $^{15}/_{1000}$ and 165/10000 of an inch (between 0.38 mm and 0.42 mm). Further, in these other embodiments, the minimum clearance may vary in the range between $^{7}/_{1000}$ and $^{85}/_{10000}$ of an inch (between 0.18 mm and 0.22 mm).

Figure 5:
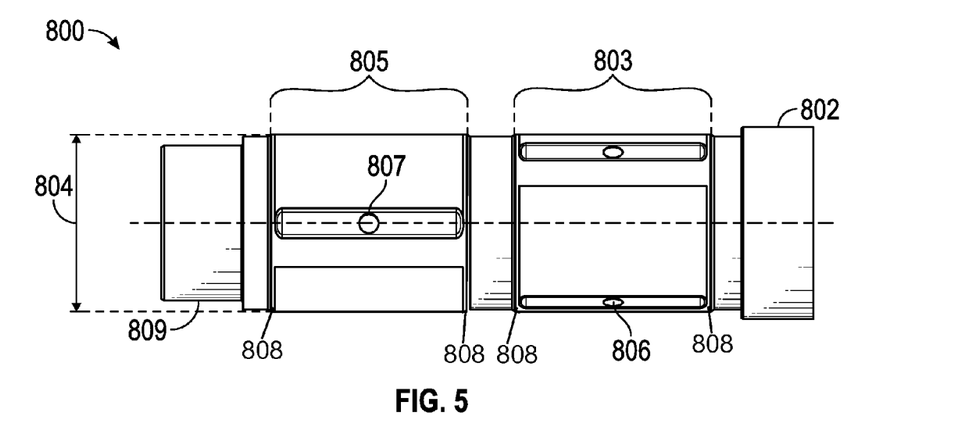
FIG. 5 is a side view of the bearing of one of the planetary gears of the epicyclical gear system of FIG. 3.

FIG. 5 is a side view of the bearing 800 of one of the planetary gears of the epicyclical gear system 730 of FIG. 3. As illustrated, the bearing 800 is formed as a substantially cylindrical body having a diameter 804 and a pair of bearing support sections 802, 809. The pair of bearing support sections 802, 809 may support the bearing 800 when inserted through the central bores 739, 743 of the input and output planetary gears 732, 733. The bearing 800 also includes one or more gear supporting sections 803, 805, which are inserted in to the central bores 739, 743 of the input and output planetary gears 732, 733. For example, in the embodiment of FIG. 5 includes an input planetary gear supporting section 805 inserted into the central bore 739 of the input planetary gear 732 and an output planetary gear supporting section 803 inserted into the central bore 743 of output planetary gear 733 with a dam region 808 formed at the edges of the input planetary gear supporting section 805 and the output planetary gear supporting section 803. Each gear supporting section 803, 805 may have an opening 806, 807 formed therein, which communicates with a hollow interior chamber 812 of the bearing 800 (not shown in FIG. 5, discussed in greater detail below with respect to FIGS. 7 and 8) within the bearing 800. For example, in the illustrated embodiment, the output planetary gear supporting section 803 has the opening 806 and the input planetary gear supporting section 805 has the opening 807.

Figure 6:
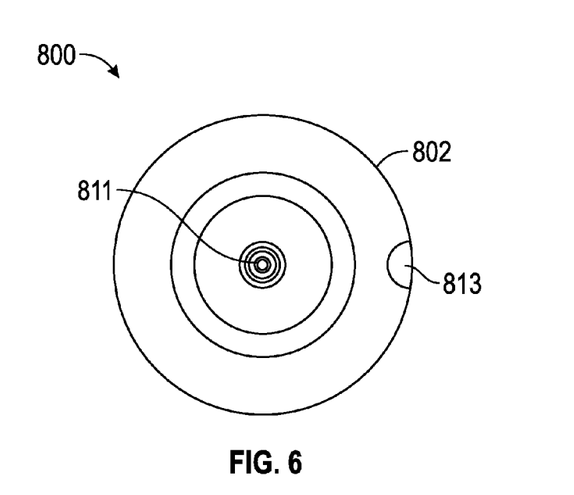
FIG. 6 is an end view of the bearing of FIG. 5.

FIG. 6 is an end view of one of the bearing support section 802 of the bearing 800 of FIG. 5. As illustrated the end of the bearing support section 802 may have an opening 811 formed therein, which also with communicates with a hollow interior chamber 812 of the bearing 800 (not shown in FIG. 6, discussed in greater detail below with respect to FIGS. 7 and 8). In some embodiments, the opening 811 may also include fittings, seals, and other components to allow the connection and communication of oil supply lines to provide oil to the a hollow interior chamber 812 of the bearing 800. Similarly, another opening (not labeled) may also be provided at the end of bearing support section 809 on the opposite end of bearing 800.

The bearing support section 802 also includes an indexing notch 813 that can be used to orient the bearing 800 with respect to the input and output planetary gears 732, 733, which rotate around the bearing 800. The specific placement, orientation, and/or shape are not particularly limited and may take on any form that may be apparent to a person of ordinary skill in the art.

Figure 7:
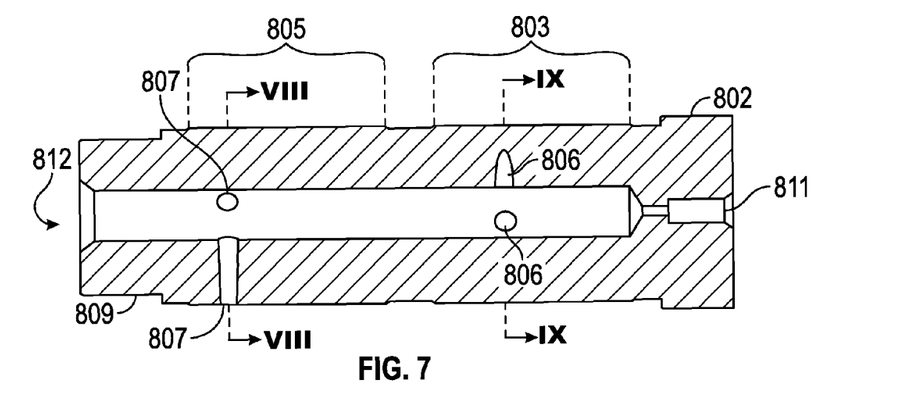
FIG. 7 is a cross-sectional view of the bearing of FIG. 5.

FIG. 7 is a cross-sectional view of the bearing 800 of FIG. 5. As discussed above, the bearing 800 includes a first gear supporting section 803 and a second gear supporting section 805 with a dam region 808 formed at the edges of the input planetary gear supporting section 805 and the output planetary gear supporting section 803. Each of the first gear supporting section 803 and the second gear supporting section 805 have a cross-sections with three-lobes over which the radial dimension of the bearing 800 (discussed in greater detail below) in FIGS. 8 and 9 varies. The first gear (output planetary gear) supporting section 803 has one or more openings 806, and as illustrated, the one or more openings 806 open to flow passages that fluidly communicate with a hollow interior 812 of the bearing 800. Further, the second gear (input planetary gear) support 805 section has one or more openings 807, and as illustrated the one or more openings 807 also open to flow passages that fluidly communicate with the hollow interior 812 of the bearing 800. The hollow interior 812 also communicated with the opening 811 formed at one end of the bearing support section 802 of the bearing 800.

Figure 8:
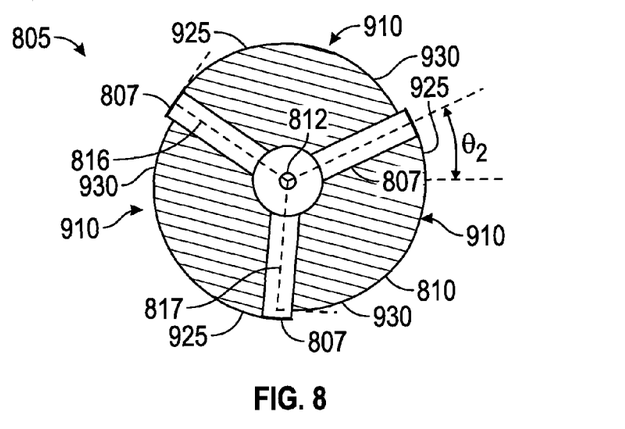
FIG. 8 is a sectional view of the bearing taken along line VIII-VIII of FIG. 7.

FIG. 8 is a sectional view of the input planetary gear supporting section 805 of the bearing 800 taken along line VIII-VIII of FIG. 7. The dimensions of the second gear supporting portion 805 have been exaggerated in FIG. 8 to aid illustration. As illustrated, the input planetary gear supporting portion 805 has a cross-section having three lobes 910 equally spaced around the circumference of the bearing 800. The radius of the bearing 800 varies over the circumference of each lobe 910. Each lobe 910 is formed with a land portion 925 having a constant radius 816, and a tapered region 930 having a radius that varies from a reduced radius 817 to the radius 816 of the land portion 925. In some embodiments, the radius 816 may be half of the total diameter 804 of the cylindrical body of the bearing 800 illustrated in FIG. 5. However, in other embodiments, the radius 816 may be less than half of total diameter 804 of the cylindrical body of the bearing 800 illustrated in FIG. 5.

Further, in some embodiments, the reduced radius 817 is less than the radius 816 of the land portion 925 by $6/1000$ of an inch (6 mils or 0.15 mm), but less than or equal to $9/1000$ (9 mils or 0.23 mm). However, the difference between the reduced radius 817 and the radius 816 of the land portion 915 may be less than or greater than these example dimensions. The variation in radius between the reduced radius 817 and the radius 816 of the land portion 925 may produce a variation in the clearance between the central bore 739 and the bearing 800 illustrated in FIG. 4. For example, the clearance at the land portion 925 may be in a range of $6/1000$ (6 mils or 0.15 mm) to $9/1000$ (9 mils or 0.23 mm) of an inch. Further, the clearance at the reduced radius 816 may be in a range of $13/1000$ (13 mils or 0.33 mm) to $18/1000$ (18 mils or 0.46 mm) of an inch. In other embodiments, the clearance at the land portion 925 may vary in the range between $15/1000$ (15 mils or 0.38 mm) and 165/10000 (16.5 mils or 0.42 mm) of an inch. Further, in these other embodiments, the clearance at the reduced radius 817 may vary in the range between $7/1000$ (7 mils or 0.18 mm) and $85/10000$ (8.5 mils or 0.22 mm) of an inch.

In some embodiments of the present application, the land portion 925 represents up to 20% of the circumferential length of each lobe 910. Further, in some embodiments the tapered region 920 represents 80% or more of each lobe 910.

In the embodiment illustrated in FIG. 8, three openings 807 are formed equally spaced around the circumference of the bearing 800, and each of the openings 807 is formed between each pair of adjacent lobes 910. As shown, each opening 807 communicates with the hollow interior 812 of the bearing 800. Further, in some embodiments of the present application each opening 807 occupies 5% of more of the circumference of the bearing 800. For example, each opening 807 may cover a portion of the circumference of the bearing 800 corresponding to the arc of a central angle of 20° (roughly 5.5% of the total circumference of the bearing 800). Further, one of the openings 807 is angularly positioned (i.e. clocked) by an angle $\theta_2$ with respect to the horizontal position (3 o'clock) position as illustrated. In some embodiments, the angle $\theta_2$ may be in a range of 15° and 35° above horizontal, for example. Additionally, in some embodiments the openings 807 and the lobes 910 of the second gear supporting section 805 are angularly offset from the openings 806 and the lobes 905 of the first gear supporting section 803 by an angle between 45° and 65°.

Figure 9:
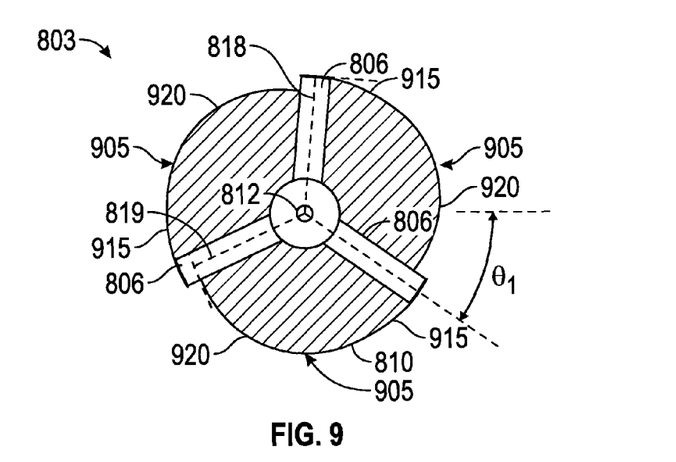
FIG. 9 is a sectional view of the bearing taken along line IX-IX of FIG. 7.

FIG. 9 is a sectional view of the output planetary gear supporting portion 803 of the bearing 800 taken along line IX-IX of FIG. 7. The dimensions of the output planetary gear supporting portion 803 have been exaggerated in FIG. 9 to aid illustration. As illustrated, the output planetary gear supporting portion 803 has a cross-section having three lobes 905 equally spaced around the circumference of the bearing 800. The radius of the bearing 800 varies over the circumference of each lobe 905. Each lobe 905 is formed with a land portion 915 having a constant radius 818, and a tapered region 920 having a radius that varies from a reduced radius 819 to the radius 818 of the land portion 915. In some embodiments, the radius 818 may be half of the total diameter 804 of the cylindrical body of the bearing 800 illustrated in FIG. 5. However, in other embodiments, the radius 818 may be less than half of total diameter 804 of the cylindrical body of the bearing 800 illustrated in FIG. 5.

Further, in some embodiments, the radius 818 of the land portion is more than the reduced radius 819 by $6/1000$ of an inch (6 mils or 0.15 mm), but less than or equal to $9/1000$ (9 mils or 0.23 mm). However, the difference between the radius 818 of the land portion 915 and the reduced radius 819 may be less than or greater than these example dimensions. The variation in radius between the reduced radius 819 and the radius 818 of the land portion 915 may produce a variation in the clearance between the central bore 743 and the bearing 800 illustrated in FIG. 4. For example, the clearance at the land portion 915 may be in a range of $6/1000$ (6 mils or 0.15 mm) to $10/1000$ (10 mils or 0.25 mm) of an inch. Further, the clearance at the reduced radius 819 may be in a range of $13/1000$ (13 mils or 0.33 mm) to $18/1000$ (18 mils or 0.46 mm) of an inch. In other embodiments, the clearance at the land portion 915 may vary in the range between $15/1000$ (15 mils or 0.38 mm) and 165/10000 (16.5 mils or 0.42 mm) of an inch. Further, in these other embodiments, the clearance at the reduced radius 819 may vary in the range between $7/1000$ (7 mils or 0.18 mm) and $85/10000$ of an inch (8.5 mils or 0.22 mm).

In some embodiments of the present application, the land portion 915 represents up to 20% of the circumferential length of each lobe 905. Further, in some embodiments the tapered region 920 represents 80% or more of each lobe 905.

In the embodiment illustrated in FIG. 9, three openings 806 are formed equally spaced around the circumference of the bearing 800, and each of the openings 806 is formed between each pair of adjacent lobes 905. As shown, each opening 806 communicates with the hollow interior 812 of the bearing 800. Further, in some embodiments of the present application each opening 806 occupies 5% of more of the circumference of the bearing 800. For example, each opening 806 may cover a portion of the circumference of the bearing 800 corresponding to the arc of a central angle of 20° (roughly 5.5% of the total circumference of the bearing 800). Further, one of the openings 806 is angularly positioned (i.e. clocked) by an angle $\theta_1$ with respect to the horizontal position (3 o'clock) position as illustrated. In some embodiments, the angle $\theta_1$ may be in a range between 30° and 50° below horizontal. For example, angle $\theta_1$ may be an angle of 40° below horizontal.

In some embodiments, the radius 817 of the lobes 910 of the second (input planetary) gear supporting section 805 may be equal to the radius 819 of the lobes 905 of the first (output planetary) gear supporting section 803. However, in other embodiments, the radius 817 may be different from the radius 819.

Similarly, in some embodiments, the reduced radius 816 of the lobes 905 of the second (input planetary) gear supporting section 805 may be equal to the reduced radius 818 of the lobes 905 of the first (output planetary) gear supporting section 803. However, in other embodiments, the reduced radius 816 may be different from the reduced radius 818.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas enters the inlet 110 as a "working fluid", and is compressed by the compressor 200. In the compressor 200, the working fluid is compressed in an annular flow path by the series of compressor rotor assemblies 220. In particular, the air is compressed in numbered "stages", the stages being associated with each compressor rotor assembly 220. For example, "4th stage air" may be associated with the 4th compressor rotor assembly 220 in the downstream or "aft" direction, going from the inlet 110 towards the exhaust 500. Likewise, each turbine rotor assembly 420 may be associated with a numbered stage.

Once compressed air leaves the compressor 200, it enters the combustor 300, where it is diffused and fuel is added. Air and fuel are injected into a combustion chamber via a fuel injector and combusted. Energy is extracted from the combustion reaction via the turbine 400 by each stage of the series of turbine rotor assemblies 420. Exhaust gas may then be diffused in an exhaust diffuser, collected and redirected. Exhaust gas exits the system via an exhaust collector and may be further processed (e.g., to reduce harmful emissions, and/or to recover heat from the exhaust gas).

With reference to FIGS. 1 and 2, the energy extracted from the combustion reaction via the turbine 400 results in a rotational torque being applied to each turbine rotor 401 of the turbine rotor assembly 420. The energy generated by the torque is transferred from the turbine assembly 420 to the power output coupling 600 by the gas producer shaft 120. The power output coupling 600 of the gas turbine engine 100 transfers the energy to the power input coupling 720 of the gearbox 700, which transfers the energy to the input shaft 721. The input shaft 721 transfers the energy to the drive gear system 730, which transfers the energy to one or more gas turbine engine accessories, such as electrical generators, fluid pumps, and heat exchangers (not shown) at a desired torque and speed.

Specifically, the input shaft 721 transfers the energy to the sun gear 731, which transfers the energy to the input planetary gear 732. The input planetary gear 732 transfers the energy to the output planetary gear 733, which transfers the energy to the ring gear 734, which transfers the energy to the output shaft 742 and the gearbox power output 740. The gearbox power output 740 transfers the energy to the one or more gas turbine engine accessories, such as electrical generators, fluid pumps and heat exchangers (not shown) at a desired torque and speed.

During operation of the gas turbine engine 100, gearbox 700 and gas turbine accessories, sub-synchronized vibrations may develop due to the translational and rotational coupling of various rotational components. As the shafts 721, 742 and gears 731, 732, 733, 734 rotate at full speed, the sub-synchronized vibrations can grow, resulting in power-loss, premature wear and early failure of the gearbox 700. In order to reduce vibrations of the bearing 800, which supports the pair of planetary gears (input planetary gear 732 and output planetary gear 733), is provided with a hollow interior chamber 812, at least one opening 811 formed in at least one end, and a plurality of openings 806, 807 formed in the circumference of the bearing 800. Oil can be feed into the hollow interior 812 from the opening 811 formed at one end, and out the openings 806, 807 formed in the circumference of the bearing 800. By providing three openings 806 in the first gear supporting section 803 and three openings 807 in the second gear supporting section 805, Applicants have found that a significant reduction in vibrations and power-loss due to vibration can be achieved. Further, a dam region 808 may also be provided at each edge of each of the first gear supporting section 803 and the second gear supporting section 805 to control the loss of oil from the first and second gear supporting sections 803, 805 during operation of the gearbox 700. The dam regions 808 each have a diameter equal to the diameter 804 of the cylindrical body.

Additionally, by forming the two gear supporting sections (first gear supporting section 803 and second gear supporting section 805), each having a tri-lobe cross-section as illustrated in FIGS. 8 and 9, Applicants have also found that a further reduction in vibrations and power-loss due to the vibrations could be achieved. Specifically, Applicants have found that the greatest reduction in vibrations was achieved by forming the first gear supporting section 803 with three lobes 905, each lobe 905 having a land portion 915 representing 20% or more of the lobe 905, a tapered portion 920 representing 80% or less of the lobe 905, and an opening 806 formed between adjacent pairs of lobes 905. Similarly, Applicants have also found that the greatest reduction in vibrations was achieved by forming the second gear supporting section 805 with three lobes 910, each lobe 910 having a land portion 925 representing 20% or more of the lobe 910, a tapered portion 930 representing 80% or less of the lobe 910, and an opening 807 formed between adjacent pairs of lobes 910.

Further, Applicants have also found that a reduction in vibrations can also be achieved if the clearance between the bearing 800 at the land portions 915, 925 and the central bore 739, 743 of the supported gears 732, 733 is in the range of $6/1000$ (6 mils or 0.15 mm) of an inch and $10/1000$ (10 mils or 0.25 mm) of an inch. Further, a maximum reduction in vibration may be achieved if the clearance between the bearing 800 at the land portions 915, 925 and the central bore 739, 743 of the supported gears 732, 733 is in the range between $7/1000$ (7 mils or 0.18 mm) and $85/10000$ (8.5 mils or 0.22 mm) of an inch. Further, Applicants have also found that a reduction in vibrations can be achieved if the clearance between the bearing 800 at the reduced radius 817, 819 and the central bore 739, 743 of the supported gears 732, 733 is in the range of $13/1000$ (13 mils or 0.33 mm) of an inch and $18/1000$ (18 mils or 0.46 mm) of an inch. Further, a maximum reduction in vibration may be achieved if the clearance between the bearing 800 at the reduced radius 817, 819 and the central bore 739, 743 of the supported gears 732, 733 is in the range between 15/1000 (15 mils or 0.38 mm) and 165/10000 (16.5 mils or 0.42 mm) of an inch.

By reducing vibrations and power-loss due to vibrations as discussed above, wear and premature failure of the gearbox 700 can also be reduced, which could save repair costs and avoid work-time losses due to needing repairs.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes a particular fuel injector, it will be appreciated that the fuel injector in accordance with this disclosure can be implemented in various other configurations, can be used with various other types of gas turbine engines, and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A gearbox comprising:
    a bearing having
        a substantially cylindrical body defining a hollow interior chamber, the cylindrical body having
        a first gear supporting section and a second gear supporting section, each of the first gear supporting section and the second gear supporting section having a cross-section formed by three lobes equally distributed around a circumference of the cylindrical body, each lobe of the three lobes having
            a land portion forming a first radius of the cylindrical body over at least 20% of each lobe,
            a tapered portion gradually sloping from the first radius of the land portion to a reduced radius region having a second radius, which is smaller than the first radius, the tapered portion being formed over less than 80% of each lobe, and
            an opening formed in the reduced radius region of each lobe;
        at least one flow passage fluidly connecting the hollow interior of the cylindrical body with each of openings formed in the reduced radius regions of the three lobes,
        wherein the land portion of one of the lobes of the first gear supporting section is angularly offset from the land portion of one of the lobes of the second gear supporting section by an angle less than or equal to 65° and greater than or equal to 45°;
    a first gear mounted on the first gear supporting section, the first gear coupled to a ring gear of an output shaft of the gearbox; and
    a second gear mounted on the second gear supporting section, the second gear rotationally coupled to the first gear and coupled to an input shaft of the gas turbine engine.

2. The bearing of claim 1, wherein the opening of each of the three lobes is formed over at least 5% of the circumference of the cylindrical body.

3. The bearing of claim 1, wherein the first radius is at least 5/1000 of an inch greater than the second radius.

4. The bearing claim 3, wherein the first radius is no more than 10/1000 of an inch greater than the second radius.

5. The bearing of claim 1, wherein the cylindrical body further comprises a dam region formed with the first radius around the entire circumference of the cylindrical body, the dam region being disposed between the first gear supporting section and the second gear supporting section.

6. A gearbox comprising:
    a bearing having
        a substantially cylindrical body defining a hollow interior chamber, the cylindrical body having
        a first gear supporting section having a cross-section formed by three lobes equally distributed around a circumference of the cylindrical body, each lobe of the three lobes having
            a land portion forming a first radius of the cylindrical body over at least 20% of each lobe of the first gear supporting section,
            a tapered portion gradually sloping from the first radius of the land portion to a reduced radius region having a second radius, which is smaller than the first radius, the tapered portion being formed over less than 80% of each lobe of the first gear supporting section,
            an opening formed in the reduced radius region of each lobe, and
            a flow passage fluidly connecting the hollow interior of the cylindrical body with each of openings formed in the reduced radius regions of each of the three lobes of the first gear supporting section; and
        a second gear supporting section having a cross-section formed by three lobes equally distributed around a circumference of the cylindrical body, each lobe of the three lobes having
            a land portion forming the first radius of the cylindrical body over at least 20% of each lobe of the second gear supporting section,
            a tapered portion gradually sloping from the first radius of the land portion to a reduced radius region having the second radius, which is smaller than the first radius, the tapered portion being formed over less than 80% of each lobe of the second gear supporting section,
            an opening formed in the reduced radius region of each lobe of the second gear supporting section, and
            a flow passage fluidly connecting the hollow interior of the cylindrical body with each of openings formed in the reduced radius regions of each of the three lobes of the second gear supporting section, the flow passage of one of the lobes of the second gear supporting section being angularly positioned an angle between 15° and 35° above horizontal,
        wherein the land portion of one of the lobes of the first gear supporting section is angularly offset from the and portion of one of the lobes of the second gear supporting section by an angle less than or equal to 65° and greater than or equal to 45°;
    a first gear mounted on the first gear supporting section, the first gear coupled to a ring gear of an output shaft of the gearbox; and
    a second gear mounted on the second gear supporting section, the second gear rotationally coupled to the first gear and coupled to an input shaft of the gas turbine engine.

7. The bearing of claim 6, wherein the opening of each of the three lobes of the first gear supporting section is formed over at least 5% of the circumference of the cylindrical body; and the opening of each of the three lobes of the second gear supporting section is formed over at least 5% of the circumference of the cylindrical body.

8. The bearing of claim 6, wherein the first radius is at least $5/1000$ of an inch greater than the second radius.

9. The bearing claim 8, wherein the first radius is no more than $10/1000$ of an inch greater than the second radius.

10. The bearing of claim 6, wherein the cylindrical body further comprises a dam region formed with the first radius around the entire circumference of the cylindrical body, the dam region being disposed between the first gear supporting section and the second gear supporting section.

11. A gearbox comprising:
an input shaft;
an input planetary gear engaging and radially offset from the input shaft, the input planetary gear defining a first central bore;
an output planetary gear defining a second central bore aligned with the first central bore, the output planetary gear rotationally coupled to the input planetary gear,
a ring gear coupled to the one output planetary gear;
an output shaft coupled to the ring gear; and
a bearing inserted into the first central bore of the input planetary gear and the second central bore of the output planetary gear, the bearing having a substantially cylindrical body defining a hollow interior chamber, the cylindrical body having:
an output planetary gear supporting section supporting the output planetary gear, the output planetary gear supporting section having a cross-section formed by three lobes equally distributed around a circumference of the cylindrical body, each lobe of the three lobes having
a land portion forming a first output clearance between a first radius of the cylindrical body and an inner radius of the second central bore over at least 20% of each lobe of the output planetary gear supporting section,
a tapered portion gradually sloping from the first output clearance of the first radius of the land portion to a second output clearance, which is greater than the first output clearance, between a reduced radius region of the cylindrical body and the inner radius of the second central bore, the tapered portion being formed over less than 80% of each lobe of the output planetary gear supporting section,
an opening formed in the reduced radius region of each lobe of the output planetary gear supporting section, and
a flow passage fluidly connecting the hollow interior of the cylindrical body with each of openings formed in the reduced radius regions of each of the three lobes of the output planetary gear supporting section, the flow passage of one of the lobes of the output planetary gear supporting section being angularly positioned an angle between 30° and 50° below horizontal; and
an input planetary gear supporting section supporting the input planetary gear, the input planetary gear supporting section having a cross-section formed by three lobes equally distributed around a circumference of the cylindrical body, each lobe of the three lobes having
a land portion forming a first input clearance between the first radius of the cylindrical body and an inner radius of the first central bore over at least 20% of each lobe of the input planetary gear supporting section,
a tapered portion gradually sloping from the first input clearance of the first radius of the land portion to a second input clearance, which is greater than the first input clearance, between the reduced radius region of the cylindrical body and the inner radius of the first central bore, the tapered portion being formed over less than 80% of each lobe of the input planetary gear supporting section,
an opening formed in the reduced radius region of each lobe, and
a flow passage fluidly connecting the hollow interior of the cylindrical body with each of openings formed in the reduced radius regions of each of the three lobes of the input planetary gear supporting section.

12. The gearbox of claim 11, wherein the opening of each of the three lobes of the output planetary gear supporting section is formed over at least 5% of the circumference of the cylindrical body; and
the opening of each of the three lobes of the input planetary gear supporting section is formed over at least 5% of the circumference of the cylindrical body.

13. The gearbox of claim 11, wherein the first output clearance of the output planetary gear supporting section is greater than or equal to $5/1000$ of an inch and is less than or equal to $10/1000$ of an inch; and
the first input clearance of the input planetary gear supporting section is greater than or equal to $5/1000$ of an inch and is less than or equal to $10/1000$ of an inch.

14. The gearbox of claim 13, wherein the second output clearance of the output planetary gear supporting section is greater than or equal to $13/1000$ of an inch and is less than or equal to $18/10000$ of an inch; and
the second input clearance of the input planetary gear supporting section is greater than or equal to $13/1000$ of an inch and is less than or equal to $18/1000$ of an inch.

15. The gearbox of claim 11, wherein the land portion of one of the lobes of the output planetary gear supporting section is angularly offset from the land portion of one of the lobes of the input planetary gear supporting section by an angle less than or equal to 65° and greater than or equal to 45°.

16. The gearbox of claim 11, wherein the cylindrical body further comprises a dam region formed with the first radius around the entire circumference of the cylindrical body, the dam region being disposed between the input planetary gear supporting section and the output planetary gear supporting section.

* * * * *